Patented June 17, 1924.

1,498,315

UNITED STATES PATENT OFFICE.

JAMES BADDILEY AND JAMES HILL, OF MANCHESTER, AND EDWARD BERTRAM ANDERSON, OF HEMYOCK, NEAR TIVERTON, ENGLAND, ASSIGNORS TO BRITISH DYESTUFFS CORPORATION LIMITED, OF MANCHESTER, ENGLAND.

PROCESS FOR DYEING ACETYL CELLULOSE.

No Drawing. Application filed July 23, 1923. Serial No. 653,353.

*To all whom it may concern:*

Be it known that we, JAMES BADDILEY and JAMES HILL, residents of Manchester, England, and EDWARD BERTRAM ANDERSON, resident of Hemyock, nr. Tiverton, England, subjects of the King of England, have invented certain new and useful Improvement in the Processes for Dyeing Acetyl Cellulose, of which the following is a specification.

Speaking generally it has not hitherto been possible to dye acetyl silk or fibres consisting of or containing the same with acid or direct dyes. In our view the process of acetyl silk dyeing is a kin to extraction of organic matter from aqueous solution by a non-miscible organic solvent. The acid and direct dyeing colouring matters used for dyeing wool and cotton are solubilized in most cases by sulpho groups but whilst sulpho groups do confer water solubility they render the dyestuffs insoluble in organic solvents and such dyestuffs have little or no affinity for artificial fibres or masses formed of unhydrolyzed acetyl cellulose.

We have recognized the rule that dyestuffs, which are solubilized by containing carboxylic acid groups in the molecule, remain soluble in organic solvents and are suitable for dyeing acetyl silk.

The new rule can be applied in the manufacture of dyestuffs for acetyl silk in various ways. In the present application for patent we claim as our invention the use, in dyeing acetyl silk, of soluble amino azo dyestuffs containing one or more carboxylic acid groups and containing further a diazotizable amino group so that after dyeing with the carboxylated azo amino dye different shades can be obtained by diazotizing the dyestuff on the fibre and developing with various well-known developers in the usual way.

The soluble amino azo dyestuffs can be obtained by the standard reactions for obtaining amino azo dyestuffs but using carboxylated materials for either the diazo compound or for the component or components or both and no sulphonated materials can be employed.

The following table gives instances of the new dyestuffs and the shades obtained upon direct dyeing and the shades after development with some of the ordinary developers.

| No. | Constitution. | Shade on acetyl silk. | | | |
|---|---|---|---|---|---|
| | | Direct. | Dev. with $\beta$-naphthol. | Dev. with $\beta$-oxynaphthoic acid. | Dev. with p-amino diphenylamine. |
| 1 | m-Aminobenzoic acid+o-anisidine | Yellow | Scarlet | Magenta | Gold. |
| 2 | m-Aminobenzoic acid+anthranilic acid | Yellow | Red | Bluish-red | Olive. |
| 3 | p-Amino-salicylic acid+$\alpha$-naphthylamine | Yellow | Violet | Reddish-blue | Olive. |
| 4 | 5-Acetyl-amino-2-amino-4-methoxy-toluene+$\beta$-oxynaphthoic acid (hydrolized). | Blue-violet | Greenish blue | Blue | Reddish violet. |
| 5 | m-Aminobenzoic acid+p-xylidine+m-phenylene-diamine | Red | Reddish-brown | Reddish-brown | Brown. |
| 6 | m-Aminobenzoic acid+p-xylidine+$\alpha$-naphthylamine | Brownish-red | Reddish-violet | Reddish-violet | Brown. |
| 7 | m-Aminobenzoic acid+m-toluidine | Yellow | Scarlet | Bluish-red | |
| 8 | Anthranilic acid+o-anisidine | Orange | Bluish-red | Reddish-blue | |
| 9 | m-Aminobenzoic acid+$\alpha$-naphthylamine | Reddish-orange | Reddish-violet | Reddish-blue | |
| 10 | p-Aminobenzoic acid+aminohydroquinone-dimethyl-ether | Orange | Reddish-violet | Blue | |
| 11 | m-Aminobenzoic acid+4-nitro-2-anisidine | Greenish-yellow | Reddish-orange | Red | |
| 12 | m-Aminobenzoic acid+1.2-aminonaphthol ether | Red | Greenish-blue | Bluish-green | |

The dyestuffs are used preferably in the form of their sodium salts and are applied to the acetyl silk from the usual water dye bath without any addition, or if desired with the addition of a weak acid or of a salt or both.

What we claim is:—

1. The process of dyeing acetyl cellulose which consists in applying amino-azo dyestuffs, solubilized by the presence of carboxy groups and containing no sulphonic acid groups, to the material from the usual water dye bath.

2. The process of dyeing acetyl cellulose which consists in applying amino-azo dyestuffs containing a diazotizable amino group, said dyestuff being solubilized by the presence of carboxy groups and containing no sulphonic acid groups, to the material from the usual water dye bath.

In testimony whereof, we have hereunto affixed our signatures.

J. BADDILEY.
JAS. HILL.
EDWARD BERTRAM ANDERSON.